No. 813,422. PATENTED FEB. 27, 1906.
H. HILL.
SELF PROPELLED VEHICLE.
APPLICATION FILED MAR. 20, 1905.
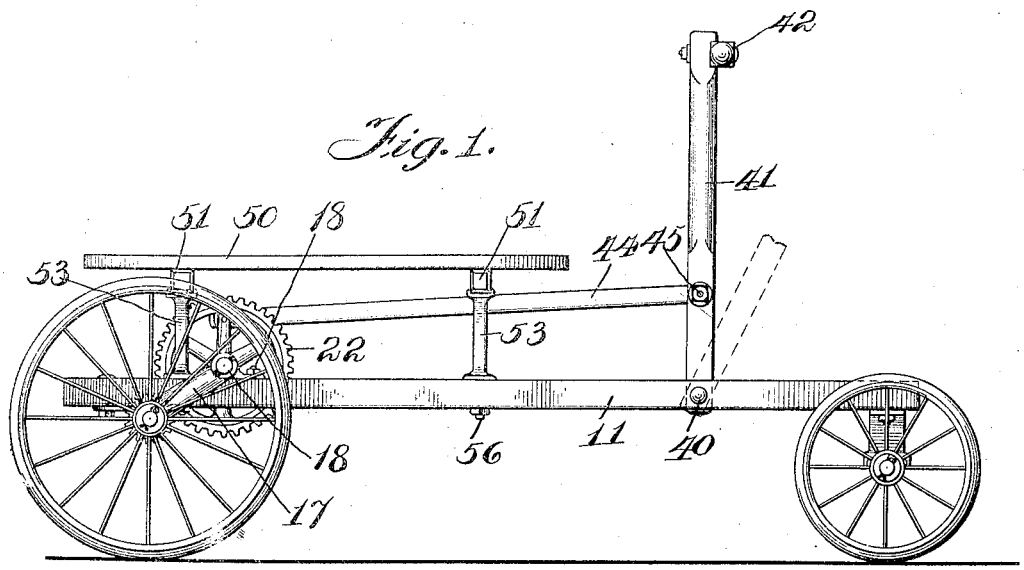
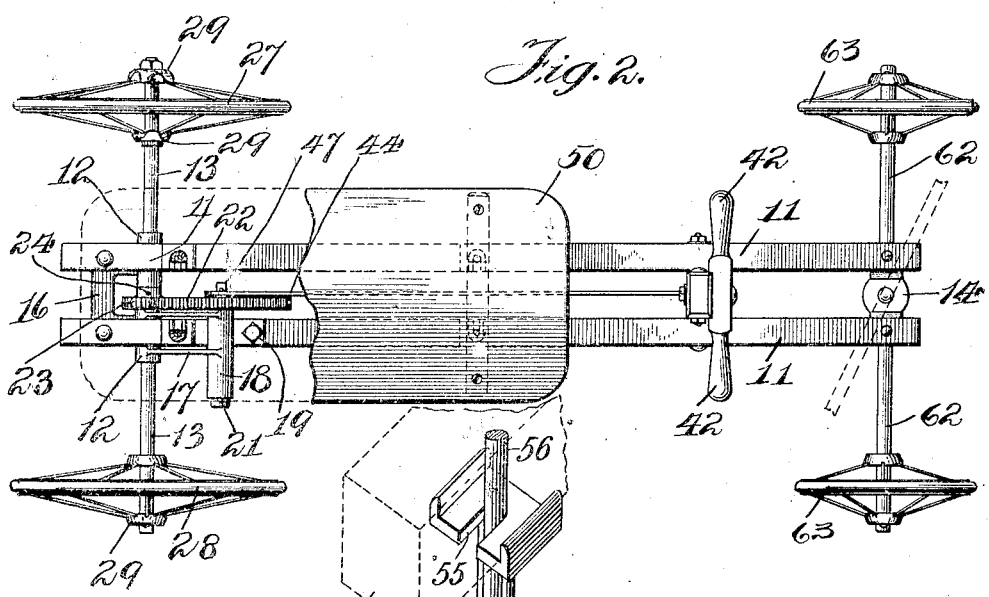
Witnesses:
Inventor
Hugh Hill
By Cheever Cox
Attys

UNITED STATES PATENT OFFICE.

HUGH HILL, OF ANDERSON, INDIANA, ASSIGNOR TO HILL STANDARD MANUFACTURING COMPANY, OF ANDERSON, INDIANA, A CORPORATION OF INDIANA.

SELF-PROPELLED VEHICLE.

No. 813,422.     Specification of Letters Patent.     Patented Feb. 27, 1906.

Application filed March 20, 1905. Serial No. 251,045.

*To all whom it may concern:*

Be it known that I, HUGH HILL, a citizen of the United States, residing at Anderson, in the county of Madison and State of Indiana, have invented a certain new and useful Improvement in Self-Propelled Vehicles, of which the following is a specification.

My invention relates to children's carts, and particularly to those propelled by the hands of the rider while sitting upon the cart.

My invention consists in mechanism for such a cart which can be very easily and cheaply made and erected, which is efficient in operation, and not readily liable to get out of order.

It consists particularly in a novel form of means for giving rigidity to the gearing of the driving mechanism and in other details, which will be hereinafter more fully described and claimed.

The drawings illustrate the preferred form of my invention, Figure 1 being a front elevation, and Fig. 2 a plan view, of the same. Fig. 3 is a perspective detail view of one of the posts for supporting the seat.

Again referring to Fig. 1, we see the longitudinal girders 11 of the main frame of the cart having secured to its rear portion bearings 12, in which the driven shaft 13 is journaled, and having secured to their forward ends the bolster 14, which will hereinafter be more fully described in detail. The castings for this bolster 14 and the bearings 12, together with the longitudinal members or girders 11, form the main frame of the cart, the bearings 12 being connected together by the U-shaped connecting member 16.

Rising from one bearing 12 are two diagonal struts 17 on opposite sides of one of the longitudinal members 11, as shown in Fig. 2, the upper ends of these struts 17 meeting and joining with a bearing 18, adapted to be secured to the top of the longitudinal member 11 by the bolt 19. In this bearing 18 is journaled a short shaft 21, carrying upon one end a large gear-wheel 22. This gear-wheel 22 meshes in a pinion 23, rigidly secured by a pin 24 or other suitable means to the shaft 13 between the bearings 12 and inside the U-shaped casting 16, heretofore described. By this construction, just described, the connection of the bearings 12 and 18, both with reference to each other and to the frame of the cart, is made very rigid, thereby insuring smooth running of the gears.

On the outer ends of the driving-axle 13 are traction-wheels 27 and 28. The wheel 27 is secured to the shaft 13 by means of claw-shaped clips 29, as more fully appears in my divisional application, Serial No. 273,044, filed by me August 7, 1905.

Pivoted to the main frame of the cart at 40, somewhere near the front of the cart, is an upright hand-lever 41, having cross-handles 42, adapted to be grasped by the rider when seated upon the cart. This lever 41 is connected with the gear-wheel 22, heretofore described, by a connecting-rod 44, secured to the lever 41 by the pivot-bolt 45 and secured to the wheel 22 on the crank-pin 47, so that moving the lever 41 backward and forward will cause the wheel 22 to rotate and communicate power through the pinion 23 to the shaft 13 and thence to the driving-wheel 27, thereby propelling the cart.

In order to allow the cart to turn corners, it is desirable that the two rear wheels should not be both rigidly secured to the shaft 13, and I accordingly loosely journal the wheel 28 upon this shaft. Accordingly no power is communicated from the lever 41 to this wheel 28 to propel the cart.

I provide a seat 50, so that one or more children can ride upon the cart. This seat is usually made of plain wood reinforced by cross-bearers 51 and is mounted upon four posts 53, resting upon the longitudinal members 11. These posts, pillars, or columns 53 are of peculiar construction in that instead of having a hole made throughout their entire length to receive the bolts to be hereinafter described they have, as shown in Fig. 3, a notch or recess 55, in which a bolt 56, passing through the longitudinal girder 11 and the seat-board 50 to secure the same together, is adapted to fit. By this construction (clearly shown in Fig. 3) I save, first, the expense of boring holes throughout the length of the posts 53, as would be necessary if the bolts 56 passed through the posts or columns 53 in the usual way, and, second, I am able by simply loosening a bolt 56 to remove a column 53 from its position in a cart, should it be desired to do so for any cause, without its being necessary to entirely remove the bolt 56 from its position. All that has to be done to effect this removal is to loosen the nut or other fastening device upon the bolt 56 and move the column or post 53 sidewise out of contact with the bolt 56 and out from between the longitudinal member 11 and seat 50.

In order to properly limit the arc of rotation of the front axle of the cart about the king-pin 60, I provide a bolster 14, heretofore referred to, having a U-shaped form, as shown. Through the bottom of this U-shaped bolster is placed the king-bolt 60, having loosely journaled upon it the front axle 62, carrying at its opposite ends the front wheel 63, as may more fully appear in detail in my divisional application, Serial No. 273,045, filed August 7, 1905.

In the operation of the device the child propelling the cart sits upon the seat 50 with his feet upon the axle 62 and guides the cart by turning the axle with his feet about the king pin or bolt 60. He at the same time grasps cross-handles 42 and moves the lever 41 backward and forward between his knees to propel the cart in the manner heretofore described.

I do not wish to be understood as limiting myself to exact details of construction, which may be varied within reasonable limits without departing from my invention.

Having thus described my invention, what I claim as new, and desire to secure by Letters Patent, is—

1. In a child's cart, the combination of a longitudinal girder or frame member 11, a bearing for the driving-axle secured upon the under side of said girder, a pinion mounted on the driving-axle in said bearing, another bearing for a supplemental gear-wheel mounted above the girder, and adjacent to the first-mentioned bearing, a gear journaled in said bearing meshing with the pinion, and struts 17 rigidly connecting the two bearings to insure accurate centering of the gear and pinion, substantially as described.

2. In a child's cart the combination of a longitudinal girder or frame member, a bearing for the driving-axle secured upon one side of said girder, a pinion mounted on the driving-axle in said bearing, another bearing for a supplemental gear-wheel mounted upon the opposite side of said girder and adjacent to the first-mentioned bearing, a gear journaled in said bearing meshing with the pinion, and a strut rigidly connecting the two bearings to insure accurate centering of the gear and pinion.

In witness whereof I have hereunto subscribed my name in the presence of two witnesses.

HUGH HILL.

Witnesses:
　GEORGE H. HALLIS.
　SANFORD M. KELTNER.